(12) United States Patent
Nakabayashi et al.

(10) Patent No.: US 12,442,655 B2
(45) Date of Patent: Oct. 14, 2025

(54) TRAVEL ROUTE SUGGESTION SYSTEM AND TRAVEL ROUTE SUGGESTION METHOD

(71) Applicant: Woven by Toyota, Inc., Tokyo (JP)

(72) Inventors: Ryota Nakabayashi, Nagoya (JP); Takahiro Suzuki, Tokyo-to (JP); Shigeyuki Kido, Tokyo-to (JP); Naoya Kuwata, Tokyo-to (JP); Hiroki Fukatsu, Tokyo-to (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 169 days.

(21) Appl. No.: 18/161,132

(22) Filed: Jan. 30, 2023

(65) Prior Publication Data
US 2023/0243664 A1    Aug. 3, 2023

(30) Foreign Application Priority Data
Feb. 2, 2022    (JP) .................................. 2022-014803

(51) Int. Cl.
*G01C 21/36* (2006.01)
*G01C 21/34* (2006.01)
*G06Q 10/02* (2012.01)

(52) U.S. Cl.
CPC ..... *G01C 21/3685* (2013.01); *G01C 21/3438* (2013.01); *G01C 21/3461* (2013.01); *G06Q 10/02* (2013.01)

(58) Field of Classification Search
CPC ............ G01C 21/3685; G01C 21/3438; G01C 21/3461; G01C 21/3423; G01C 21/20; G01C 21/3679; G06Q 10/02
(Continued)

(56) References Cited

U.S. PATENT DOCUMENTS 10,260,896 B2 *  4/2019  Singh ................. G01C 21/3626
11,199,853 B1 * 12/2021  Afrouzi ................. B25J 13/006
(Continued)

FOREIGN PATENT DOCUMENTS

JP    H10-267673 A    10/1998
JP    2010-210319 A    9/2010
(Continued)

OTHER PUBLICATIONS

Lini, S. (Mar. 9, 2018). The most compelling business case for multimodal travel: Seamless booking. LinkedIn. https://www.linkedin.com/pulse/most-compelling-business-case-multimodal-travel-seamless-simone-lini (Year: 2018).*
(Continued)

*Primary Examiner* — Ramya P Burgess
*Assistant Examiner* — Keith A von Volkenburg
(74) *Attorney, Agent, or Firm* — Dickinson Wright, PLLC

(57) ABSTRACT

Input of destination information is received from a user. Information on a parking facility to be a candidate when moving to a destination and information on a transportation service for transporting between arbitrary points are acquired. Based on the acquired information, information including a candidate of a composite route combining a first route for moving from a destination to a parking facility by using a vehicle and a second route for moving from the parking facility to the destination by using a transportation service is generated, and the information is output to a user interface. When the input for selecting the composite route is received from the user, the composite route is set as the travel route and the use reservation of the transportation service is performed.

6 Claims, 4 Drawing Sheets

(58) Field of Classification Search
USPC .......................................................... 701/426
See application file for complete search history.

(56) References Cited

U.S. PATENT DOCUMENTS

| | | | | |
|---|---|---|---|---|
| 12,208,819 | B1* | 1/2025 | Funke | ................ B60W 60/0011 |
| 2008/0033640 | A1 | 2/2008 | Amano | |
| 2020/0011671 | A1* | 1/2020 | Puri | ...................... B60W 30/06 |
| 2020/0049518 | A1* | 2/2020 | Lee | ................... G01C 21/3492 |
| 2020/0304951 | A1* | 9/2020 | Beaurepaire | .......... H04W 4/024 |
| 2020/0378771 | A1* | 12/2020 | Beaurepaire | ....... G06Q 30/0284 |
| 2020/0378775 | A1* | 12/2020 | Beaurepaire | ....... G01C 21/3423 |
| 2020/0400446 | A1* | 12/2020 | Beaurepaire | ........... G08G 1/144 |
| 2021/0019376 | A1* | 1/2021 | Neubauer | ............ G08G 1/0129 |
| 2021/0114616 | A1* | 4/2021 | Altman | ................. H04W 76/15 |
| 2021/0341300 | A1* | 11/2021 | Beaurepaire | ....... G01C 21/3492 |
| 2021/0356279 | A1* | 11/2021 | Szigeti | ............... G01C 21/3407 |
| 2022/0005140 | A1* | 1/2022 | Beaurepaire | ........ G06F 16/9535 |
| 2022/0024280 | A1* | 1/2022 | Austin | ............... B60H 1/00807 |
| 2024/0337496 | A1* | 10/2024 | Neumann | .......... G01C 21/3415 |

FOREIGN PATENT DOCUMENTS

| | | | | |
|---|---|---|---|---|
| JP | 2014-089153 A | | 5/2014 | |
| JP | 2015-203892 A | | 11/2015 | |
| KR | 20210136358 A | * | 11/2021 | ......... G01C 21/3453 |
| WO | 2006/001413 A1 | | 1/2006 | |

OTHER PUBLICATIONS

Willing,C.,Brandt,T.,&Neumann,D.(2017).Intermodalmobility.Business &InformationSystems Engineering,59(3),173-179. doi:https://doi.org/10.1007/s12599-017-0471-7 (Year: 2017).*

Bell,D.(2019).Intermodalmobilityhubsanduserneeds. SocialSciences,8(2)doi:https://doi.org/10.3390/socsci8020065 (Year: 2019).*

HowardRW.Automaticflightcontrolsinfixedwingaircraft—Thefirst100years.TheAeronauticalJournal.1973;77(755):533-562. doi:10.1017/S0001924000041889 (Year: 1973).*

Lini,S.(2018, March9).Themostcompellingbusinesscaseformultimodaltravel:Seamlessbooking.LinkedIn.https://www.linkedin.com/pulse/most-compelling-business-case-multimodal-travel-seamless-simone-lini (Year: 2018).*

* cited by examiner

TRAVEL ROUTE SUGGESTION SYSTEM AND TRAVEL ROUTE SUGGESTION METHOD

CROSS-REFERENCE TO RELATED APPLICATION

The present application claims priority under 35 U.S.C. § 119 to Japanese Patent Application No. 2022-014803, filed Feb. 2, 2022, the contents of which application are incorporated herein by reference in their entirety.

BACKGROUND

Field

The present disclosure relates to a technique for recommending a travel route to a destination to a user of a vehicle.

Background

JP2010-210319A disclose a technology relating to a navigation device that searches for a route to reach a destination and provides guidance. In this technique, when a destination is present in a restricted area in which traveling of the host vehicle is restricted, a route for reaching the destination by a transportation means that is an alternative to the host vehicle is selected based on occupant information of the host vehicle, and guidance is provided.

SUMMARY

Consider a situation where a user of a vehicle uses a navigation device to set a route to a destination. In this case, the user desires to use a parking facility as close to the destination as possible. However, the parking facility around the destination may have a situation in which the fee is high, the vehicle is always full, and it is difficult to park the vehicle, or the vehicle does not want to enter the parking facility due to road congestion. In such a case, an option of using a parking facility distant from the destination and using a transportation service as a substitute for the own vehicle such as a technique of JP2010-210319A for travel from the parking facility to the destination may be considered. However, in this case, if a series of procedures from the arrival at the parking facility to the reception of the transportation service is not smoothly performed, the user may feel dissatisfaction due to an increase in waiting time, a delay in arrival at the destination, complication of the procedures, and the like.

The present disclosure has been made in view of the above-described problem, and an object of the present disclosure is to provide a technique capable of recommending a travel route that enables smooth transfer from travel of a user to a parking facility by a vehicle to travel from the parking facility to a destination using a transport service.

According to an embodiment of the present disclosure, there is provided a travel route recommendation system that suggests a parking facility and a travel route according to a destination of a user of a vehicle to the user. The travel route recommendation system includes one or more memories storing one or more programs, one or more processors coupled to the one or more memories, and a user interface. When executing the one or more programs, the one or more processors are configured to execute: receiving an input of destination information from the user interface: acquiring parking facility use information related to one or more parking facilities that are candidates for moving to the destination and transportation service use information related to a transportation service that performs transportation between arbitrary points; generating, based on the destination information, the parking facility use information, and the transportation service use information, travel route candidate information including a candidate for a composite route combining a first route for moving from the destination to a parking facility outside a predetermined range by using the vehicle and a second route for moving from the parking facility to the destination by using the transportation service, and performing travel route recommendation processing for outputting the travel route candidate information to the user interface; and when an input for selecting the composite route from among the candidates of the travel route candidate information is received from the user interface, performing travel route setting processing of setting the composite route as the travel route and making a reservation for use of the transport service.

In the travel route recommendation processing, the one or more processors may be configured to generate, based on the destination information, the parking facility use information, and the transportation service use information, the travel route recommendation information including candidate for single route for traveling from the destination to a parking facility within a predetermined range by using the vehicle and moving from the parking facility to the destination without using the transportation service, and in the travel route setting processing, the one or more processors may be configured to set the single route as the travel route when an input for selecting the candidate for the single route from among the candidates of the travel route candidate information is received from the user interface.

In addition, in the travel route setting processing, the one or more processors may be configured to make a reservation for use of the parking facility when an input for selecting a candidate for the composite route from among candidates of the travel route candidate information is received from the user interface.

Also, while the vehicle is moving toward the parking facility, the one or more processors may be configured to provide predicted arrival information at the parking facility to the transportation service.

Further, in the travel route recommendation processing, the one or more processors may be configured to execute receiving a priority type for the travel route from the user interface, and determining a recommended travel route from the travel route candidate information based on the priority type, and output the recommended travel route to the user interface.

A travel route recommendation method according to the present disclosure is a method for recommending a parking facility and a travel route corresponding to a destination of a user of a vehicle to the user, and includes first to fourth steps.

In the first step, an input of destination information is received from a user interface.

In the second step, parking facility use information related to one or more parking facilities that are candidates when traveling to the destination and transportation service use information related to a transportation service that performs transportation between arbitrary points are acquired.

In the third step, travel route candidate information including a candidate of a composite route combining a first route for moving from the destination to a parking facility outside a predetermined range by using the vehicle and a second route for moving from the parking facility to the destination by using the transportation service is generated based on the destination information, the parking facility use information, and the transportation service use information, and the travel route candidate information is outputted to the user interface.

In the fourth step, when an input for selecting the composite route from among the candidates of the travel route candidate information is received from the user interface, the composite route is set as the travel route and made a reservation for use of the transportation service.

According to the present disclosure, a composite route in which a first route for moving to a parking facility by using a vehicle and a second route for moving from the parking facility to a destination by using a transportation service are combined is proposed to a user. Then, when the composite route is selected by the user, the composite route is set as the travel route and the use reservation of the transportation service is performed. Thus, the user can smoothly transfer from the movement to the parking facility using the vehicle to the movement from the parking facility to the destination using the transportation service.

DETAILED DESCRIPTION

Hereinafter, an embodiment of the present disclosure will be described with reference to the drawings. Note that when the numerals of numbers, quantities, amounts, ranges, and the like of respective elements are mentioned in the embodiments shown as follows, the present disclosure is not limited to the mentioned numerals unless specially explicitly described otherwise, or unless the disclosure is explicitly designated by the numerals theoretically.

1. OUTLINE OF TRAVEL ROUTE RECOMMENDATION SYSTEM

A travel route recommendation system according to an embodiment of the present disclosure is a system that recommends travel by a composite route in which travel by a vehicle and travel using a transportation service are combined. The vehicle to which the travel route recommendation system according to the present embodiment is applied is not limited. The vehicle to which the travel route recommendation system is applied is, for example, an autonomous driving vehicle. In an autonomous driving vehicle, recognition, prediction, determination, and operation that have conventionally been performed by a driver in a vehicle are performed by an autonomous driving system. Alternatively, the vehicle to which the travel route recommendation system is applied is a conventional vehicle in which at least one of recognition, prediction, determination, and operation is performed by the driver himself/herself.

In a case where the user sets a travel route toward a destination by using a vehicle, an option of using a parking facility distant from the destination and using a transportation service for transporting between arbitrary points for travel from the parking facility to the destination is also conceivable. The travel route recommendation system of the present embodiment is a system having various functions for smoothly performing a transfer in a composite route when recommending the composite route combining a travel route by a vehicle and a travel route by a transportation service.

Figure 1:
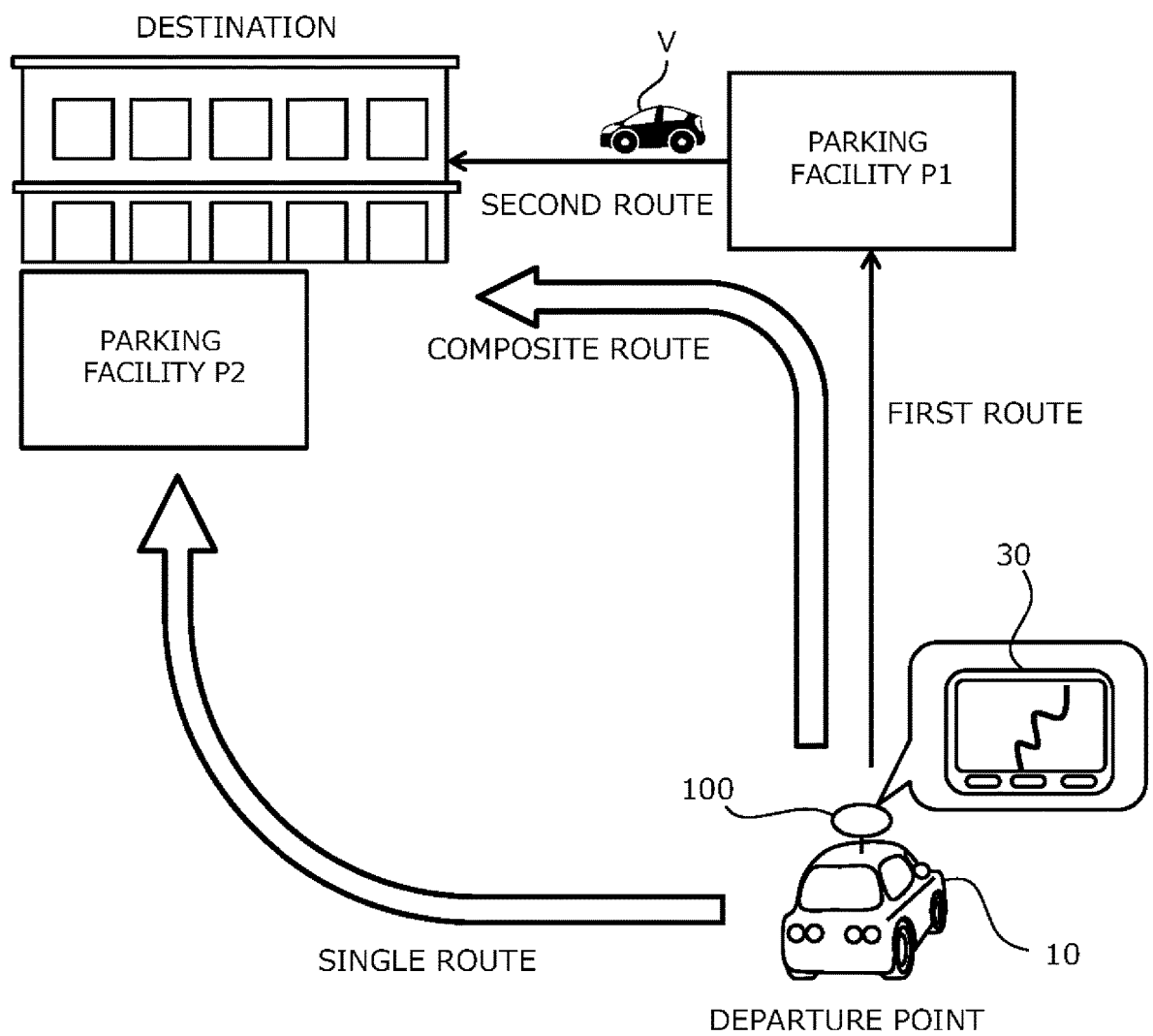
FIG. 1 is a diagram for explaining an outline of a travel route recommendation system according to an embodiment.

Hereinafter, an outline of a travel route recommendation method by the travel route recommendation system according to the present embodiment will be described with reference to FIG. 1. In FIG. 1, a vehicle 10 is a vehicle to which a travel route recommendation system 100 of the present embodiment is applied. The user of the vehicle 10 inputs destination information DINF from a user interface 30. Examples of the user interface 30 include a car navigation device mounted on the vehicle 10 or a mobile terminal such as a smartphone or a tablet carried by the user. The destination information DINF includes a departure point, a destination, a desired arrival time, and the like. As the departure point, position information acquired by a GPS device mounted on the vehicle 10 or the mobile terminal device may be used.

The travel route recommendation system 100 receives the input of the destination information DINF and recommends candidates for a travel route for traveling to the destination using the vehicle 10. Here, one or more parking facilities are present in the vicinity of the destination. A case of using a parking facility P1 at a place outside a predetermined range where a vehicular moving means is necessary, such as outside a walking range where it is difficult to move on foot from a destination, will be considered. In this case, a travel route in which a first route from the departure point to the parking facility P1 is traveled by the vehicles 10, and a second route from the parking facility P1 to the destination is moved by using the vehicle V of the transportation service which can be reserved in advance is conceivable. Examples of the transportation services that can be reserved in advance include ridesharing, taxi, shuttle bus, and rickshaw. In the following description, a travel route in which the first route using the vehicle 10 and the second route using the transportation service vehicle are combined is referred to as a "composite route".

On the other hand, when the case of using a parking facility P2 located within the walking distance from the destination, a travel route in which the vehicle 10 travels to the parking facility P2 and the user moves on foot from the parking facility P2 to the destination is also conceivable. In the following description, a travel route that does not use a transportation service vehicle is referred to as a "single route".

The travel route recommendation system 100 having received the input of the destination information DINF acquires parking facility use information PINF and transportation service use information TINF by accessing an external database. The parking facility use information PINF is use information of one or more parking facilities in the vicinity of the destination, and includes position information, vacancy information, charge information, and the like of the parking facility. The transportation service use information TINF is use information of the transportation service, and includes a service providing area, reservation vacancy information, charge information, and the like.

The travel route recommendation system 100 generates information on one or more travel route candidates based on the acquired parking facility use information PINF and transportation service use information TINF. The generated information is hereinafter referred to as "travel route candidate information". The travel route candidate information includes route details, usage fee, and required time of each travel route candidate. Further, the travel route candidate information includes at least one composite route as a travel route candidate. The travel route recommendation system 100 outputs the generated candidate information to the user interface 30. This series of processing is hereinafter referred to as "travel route recommendation processing".

The user confirms the candidate information displayed on the user interface 30 and selects a desired travel route candidate. In response to the selection of the travel route candidate by the user, the travel route recommendation system 100 sets the selected travel route candidate as the final travel route. When the selected travel route candidate is a composite route, the travel route recommendation system 100 makes a reservation for use of the transportation service. Here, the use reservation includes transmission of information on a use place, a use start time, and a destination. This series of processing is hereinafter referred to as "travel route setting processing".

The outline of the travel route recommendation system 100 has been described above. According to the travel route recommendation method of the travel route recommendation system 100, when the composite route is selected by the user, the user can move to the parking facility using the vehicle 10 and then smoothly shift to the travel using the transportation service. Thus, it is possible to enhance the convenience of the user who uses the vehicle 10 to move to the destination. Hereinafter, the configuration and processing of the travel route recommendation system 100 will be described in detail.

2. CONFIGURATION OF TRAVEL ROUTE RECOMMENDATION SYSTEM 100

Figure 2:
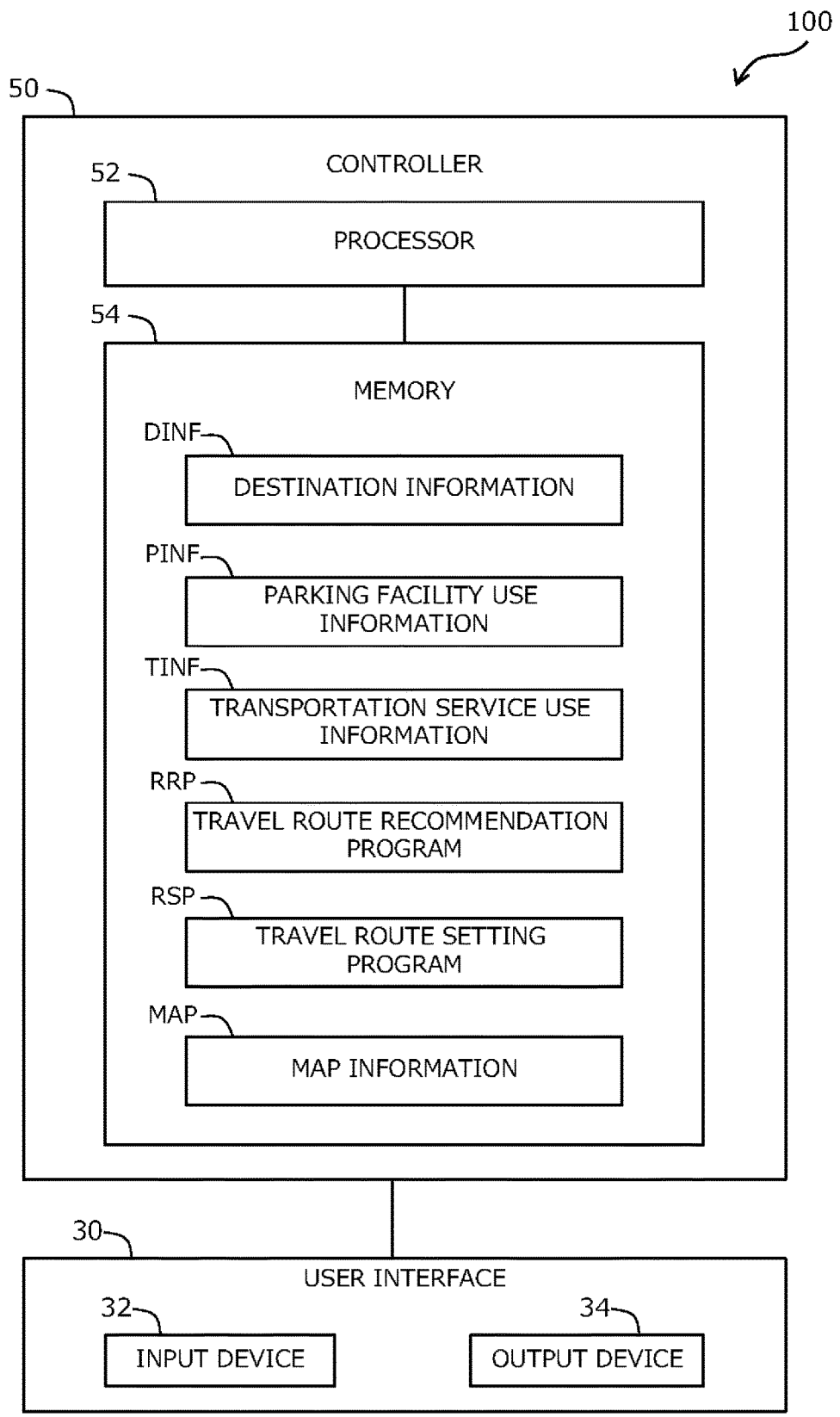
FIG. 2 is a block diagram showing a configuration of the travel route recommendation system.

FIG. 2 is a block diagram showing a configuration of the travel route recommendation system 100. The travel route recommendation system 100 includes a user interface 30 and a controller 50. The user interface 30 is a mobile terminal carried by the user or a navigation device mounted on the vehicle 10, and includes an input device 32 through which the user inputs information to the controller 50 and an output device 34 through which the user outputs information from the controller 50. Examples of the input device 32 include a touch panel, a keyboard, a microphone, and the like. Examples of the output device 34 include display on a display device such as a touch panel display and audio output from a speaker. When the user interface 30 is a navigation device, the controller 50 and the user interface 30 are connected to each other via an in-vehicle network such as a controller area network (CAN). Alternatively, when the user interface 30 is a mobile terminal, the controller 50 and the user interface 30 are connected to each other via a wireless communication network such as the Internet. The controller 50 is also connected to various sensors and actuators required for autonomous driving via an in-vehicle network.

The controller 50 is an electronic control unit (ECU) including one or more processors 52 and one or more memories 54 coupled to the one or more processors 52. Various programs and data are stored in the memory 54. The memory 54 referred to here may include a data storage device such as a magnetic disk such as an HDD, an optical disk such as a DVD, or a flash memory storage device such as an SSD, in addition to a memory in a narrow sense such as a random-access memory (RAM). Map information MAP is stored as data in the memory 54. Destination information DINF, parking facility use information PINF, and transportation service use information TINF are stored in the memory 54 as the acquired various data. The memory 54 stores at least a travel route recommendation program RRP and a travel route setting program RSP as programs. The travel route recommendation program RRP stored in the memory 54 is executed by the processor 52.

3. TRAVEL ROUTE RECOMMENDATION PROCESSING

The travel route recommendation system 100 performs travel route recommendation processing for recommending a travel route for smoothly moving to a destination input by a user. The travel route recommendation processing by the travel route recommendation system 100 is executed by the processor 52 executing the travel route recommendation program RRP. The procedure of the travel route recommendation processing by the travel route recommendation program RRP will be described below with reference to the flowchart of FIG. 3.

Figure 3:
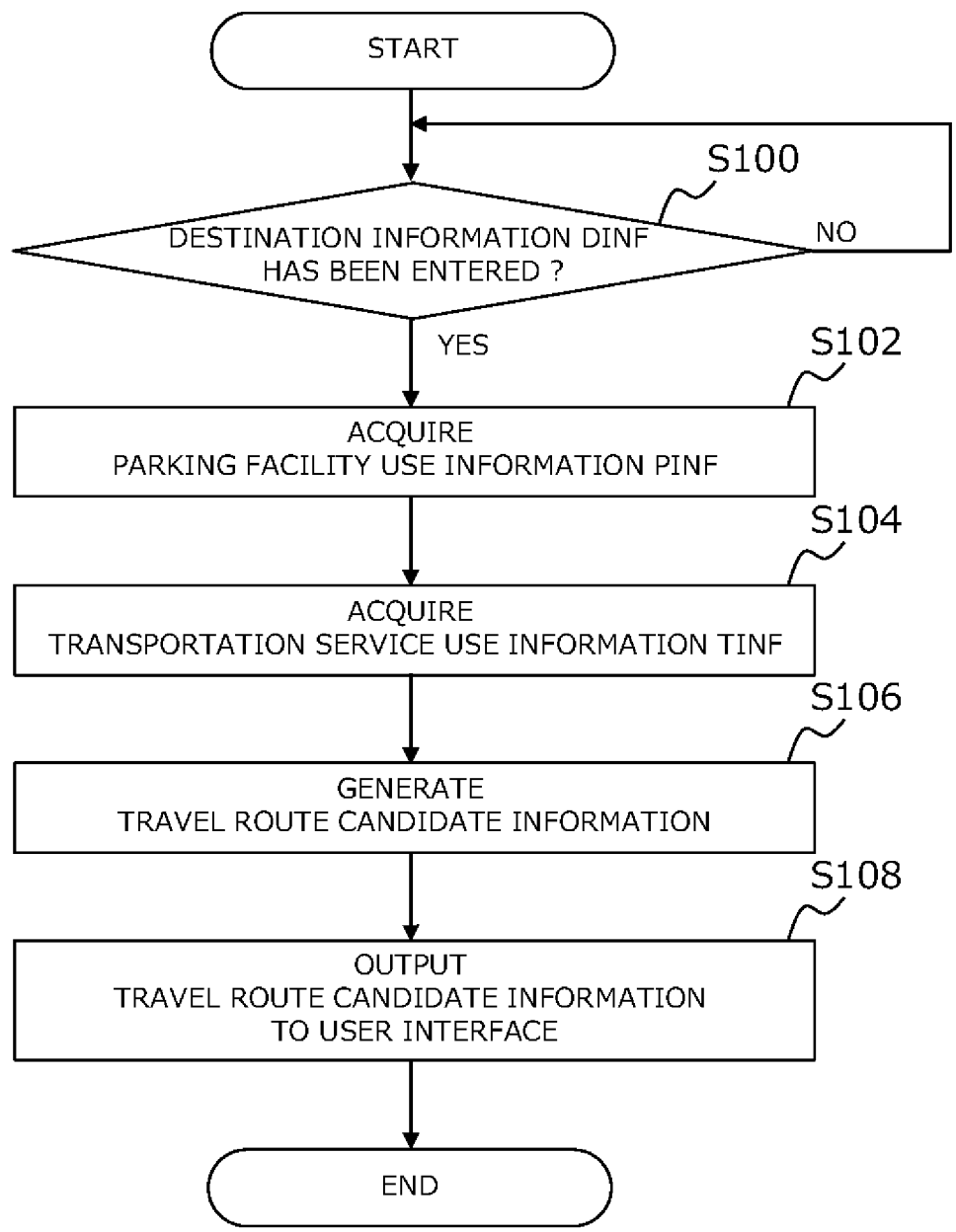
FIG. 3 is a flowchart illustrating a procedure of a travel route recommendation processing.

FIG. 3 is a flowchart illustrating a procedure of a travel route recommendation processing. In step S100, the travel route recommendation program RRP determines whether the destination information DINF has been entered by the user from the user interface 30. As a result, when the destination information DINF is not input, the process of step S100 is repeatedly executed. When the destination information DINF is input, the process proceeds to step S102.

The travel route recommendation program RRP processes the destination information DINF input to the input device 32 of the user interface 30. The destination information DINF includes a departure point and a desired arrival time in addition to a positional information of the destination. As the departure point, position information acquired by a GPS device mounted on the vehicle 10 or the mobile terminal device may be used. In step S102, the travel route recommendation program RRP uses the map information MAP and the position information of the destination in the destination information DINF to search for one or a plurality of parking facilities in the vicinity of the destination, and accesses the external database to acquire the parking facility use information PINF including the position information, the vacancy information and the charge information of each parking facility.

Further, in step S104, the travel route recommendation program RRP uses the position information of the destination in the destination information DINF to access the external database to search for the transportation service running in the vicinity of the destination, and acquires the transportation service use information TINF including the service providing area, the reservation vacancy information, and the charge information.

In step S106, the travel route recommendation program RRP generates travel route candidate information using the map information MAP, the acquired destination information DINF, the parking facility use information PINF, and the transportation service use information TINF. Here, for example, in a case where a parking facility P1 outside the walking range from the destination is available and a transportation service from the parking facility P1 to the destination is available, the travel route recommendation program RRP generates travel route candidate information of a composite route for moving to the destination using the parking facility P1 and the transportation service. In addition, for example, when a parking facility P2 within a walking distance from the destination is available, the travel route recommendation program RRP generates travel route candidate information of a single route for moving to the destination using the parking facility P2. Each piece of travel route candidate information includes details of a route, a usage fee, and a required time. In this way, the travel route recommendation program RRP generates travel route candidate information of one or more realizable travel route candidates.

The transportation service here is mainly assumed to be ride-sharing. Ridesharing is considered to be more advantageous than other transportation services represented by a taxi in terms of ease of advance reservation using an application and in terms of charge.

In step S108, the travel route recommendation program RRP outputs the generated travel route candidate information to the output device 34 of the user interface 30. The travel route recommendation program RRP may display the travel route candidate information of all realizable travel route candidates, or may limit the number of display candidates according to a predetermined condition. As such a condition, for example, up to the third candidate in order of least expensive fare, up to the third candidate in ascending order of the required time, one candidate for each of the composite route and the single route, and the like are exemplified. The user can select a desired travel route candidate by referring to the travel route candidate information output to the output device 34.

4. TRAVEL ROUTE SETTING PROCESSING

The travel route recommendation system 100 performs a travel route setting processing for setting a travel route candidate selected by the user. The travel route setting processing by the travel route recommendation system 100 is executed by the processor 52 executing the travel route setting program RSP. Hereinafter, the procedure of the travel route setting the travel route setting program RSP will be described below with reference to the flowchart of FIG. 4.

Figure 4:
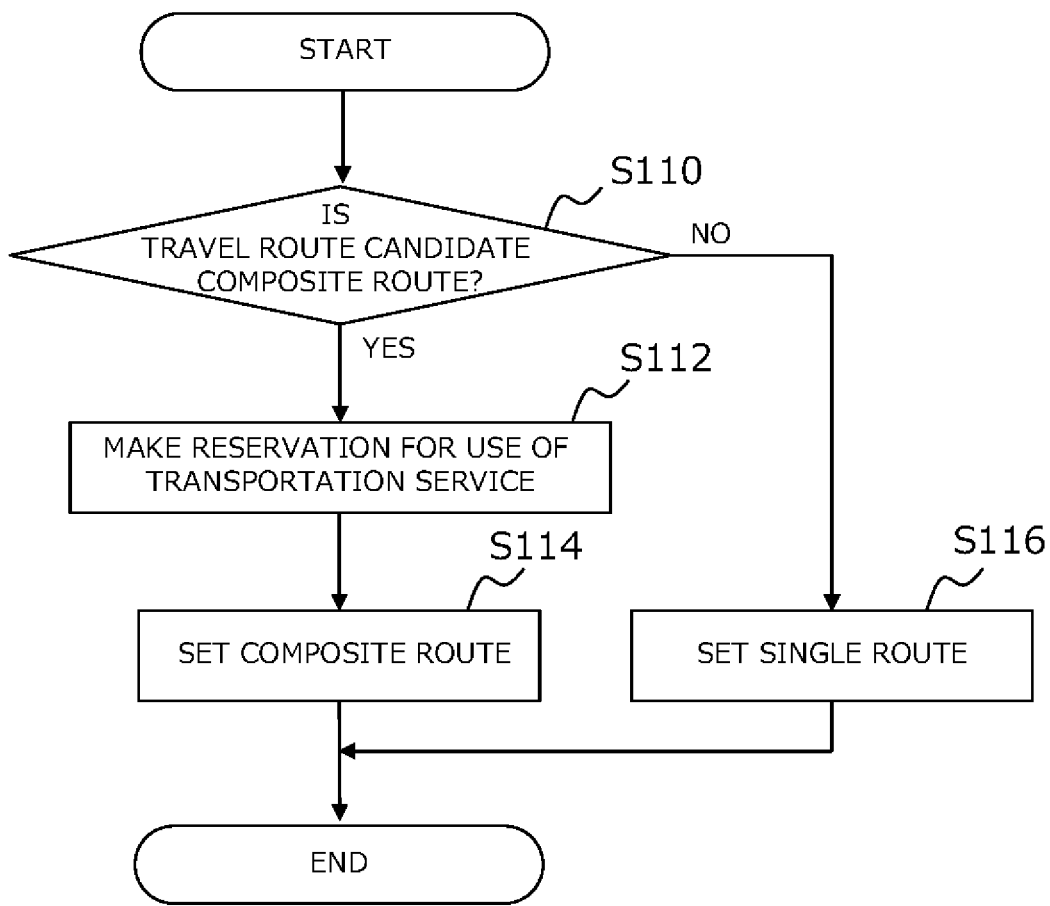
FIG. 4 is a flowchart illustrating a procedure of a travel route setting processing.

FIG. 4 is a flowchart illustrating a procedure of a travel route setting processing. In step S110, the travel route setting program RSP receives selection of a travel route candidate from the input device 32 of the user interface 30. When the selected travel route candidate is a composite route, the process proceeds to step S112. When the selected travel route candidate is a single route, the process proceeds to step S116.

In step S112, the travel route setting program RSP makes a reservation for use of the transportation service. When the parking facility to be used is a facility that can be reserved for use, the travel route setting program RSP may make a reservation for use of the parking facility. Then, in step S114, the travel route setting program RSP sets the selected composite route as a travel route in the autonomous driving system or the navigation device.

In addition, when the travel route candidate selected by the user is the single route, the use reservation of the transportation service is not necessary. Therefore, in step S116, the travel route setting program RSP sets the selected single route in the autonomous driving system or the navigation device as the travel route of the vehicle 10. When the parking facility to be used is a facility that can be reserved for use, the travel route setting program RSP may make a reservation for use of the parking facility.

As is apparent from the above description, according to the travel route recommendation system 100 of the present embodiment, when the user selects the composite route, the use reservation of the transportation service is made. Thus, the user can smoothly move to the parking facility by the vehicle 10 and move from the parking facility to the destination.

5. MODIFICATION EXAMPLE

The travel route recommendation system 100 according to the present embodiment may be modified as follows.

5-1. Recommendation of Recommended Travel Route

When generating a travel route candidate, the travel route recommendation system 100 may recommend a recommended travel route that reflects the user's desire. In this case, the travel route recommendation system 100 prompts the user to input the priority type for the travel route when the user inputs the destination. Examples of the priority type include a charge, a required time, and the like. Then, in the process of step S106, the travel route recommendation system 100 generates a recommended travel route according to the priority type. Here, among the generated one or more travel route candidates, a travel route candidate in which the priority type is most reflected is generated as a recommended route candidate. Then, in step S108, the travel route recommendation system 100 adds a recommendation display to the recommended route candidate. According to such a process, the user can quickly select a travel route in accordance with the user's desire, thereby improving convenience for the user.

5-2. Provision of Arrival Prediction Information

The travel route recommendation system 100 may be configured to provide arrival prediction information for the vehicle 10 to the transportation service during travel to the parking facility established by the composite route. Examples of the arrival prediction information include a current location, an arrival prediction time, and a delay time. Accordingly, the carrier of the transportation service can smoothly provide the travel service in accordance with the arrival of the vehicle 10, and this the convenience of the user is improved.

What is claimed is:

1. A travel route system that suggests a parking facility and a travel route according to a destination of a user of a vehicle to the user, the travel route system comprising:
   one or more memories storing one or more programs;
   one or more processors coupled with the one or more memories;
   a control system for controlling operations of the vehicle; and
   a user interface,
   wherein when executing the one or more programs, the one or more processors are configured to execute:
      receiving an input of destination information from the user interface;
      acquiring parking facility use information related to at least two parking facilities that are candidates for moving to a destination and transportation service use information related to a transportation service that performs transportation between arbitrary points, wherein the parking facility use information comprises position information, vacancy information and charge information;
      generating, based on the destination information, the parking facility use information, and the transportation service use information, at least two travel route candidates including a first candidate for a composite route combining a first route for moving to a first parking facility outside a predetermined range from the destination by using the vehicle and a second route for moving from the first parking facility to the destination by using the transportation service, and a second candidate for a single route for moving to a second parking facility inside the predetermined range from the destination, and performing travel route recommendation processing for outputting the at least two travel route candidates to the user interface, wherein each of the travel route candidates output to the user interface comprises route details, usage fee, and required time of travel route candidate; and when an input for selecting a route from among the candidates of the travel route candidate information is received from the user interface, if the route is the composite route, automatically making a reservation for use of the transport service from a point near the parking facility to the destination, performing travel route setting processing of setting the composite route as the travel route, and controlling operations of the vehicle to follow the composite route towards the parking facility by autonomous driving, and if the route is a single route, controlling operations of the vehicle to follow the single route towards the destination by autonomous driving wherein the parking facility use information comprises vacancy information of the parking facility.

2. The travel route system according to claim 1,
wherein in the travel route recommendation processing, the one or more processors are configured to generate, based on the destination information, the parking facility use information, and the transportation service use information, the travel route recommendation information including candidate for single route for traveling from the destination to a parking facility within a predetermined range by using the vehicle and moving from the parking facility to the destination without using the transportation service, and in the travel route setting processing, the one or more processors are configured to set the single route as the travel route when an input for selecting the candidate for the single route from among the candidates of the travel route candidate information is received from the user interface.

3. The travel route system according to claim 1,
wherein in the travel route setting processing, the one or more processors are configured to make a reservation for use of the parking facility when an input for selecting a candidate for the composite route from among candidates of the travel route candidate information is received from the user interface.

4. The travel route system according to claim 1,
wherein while the vehicle is moving toward the parking facility, the one or more processors are configured to provide predicted arrival information at the parking facility to the transportation service.

5. The travel route system according to claim 1,
wherein in the travel route recommendation processing, the one or more processors are configured to execute:
receiving a priority type for the travel route from the user interface; and
determining a recommended travel route from the travel route candidate information based on the priority type, and outputting the recommended travel route to the user interface.

6. A travel route method for recommending a parking facility and a travel route according to a destination of a user of a vehicle to the user, the travel route method comprising:
receiving an input of destination information from a user interface;
acquiring parking facility use information related to at least two parking facilities that are candidates when traveling to the destination and transportation service use information related to a transportation service that performs transportation between arbitrary points, wherein the parking facility use information comprises position information, vacancy information and charge information;
generating travel route candidate information based on the destination information, the parking facility use information, and the transportation service use information, at least two travel route candidates including a first candidate of a composite route combining a first route for moving to a first parking facility outside a predetermined range from the destination by using the vehicle and a second route for moving from the parking facility to the destination by using the transportation service, and a second candidate for a single route for moving to a second parking facility inside the predetermined range from the destination, and outputting the at least two travel route candidates to the user interface, wherein each of the travel route candidates output to the user interface comprises route details, usage fee, and required time of travel route candidate;
receiving an input of selected travel route from the user interface;
if the selected travel route is a composite route, automatically making a reservation for use of the transportation service, setting the composite route as the travel route, and controlling operations of the vehicle by a control system of the vehicle to follow the composite route towards the parking facility by autonomous driving, and if the selected travel route is a single route, controlling operations of the vehicle to follow the single route towards the destination by autonomous driving.

* * * * *